(12) United States Patent
Rogers et al.

(10) Patent No.: US 8,484,052 B2
(45) Date of Patent: Jul. 9, 2013

(54) SYSTEM AND METHOD FOR RECEIVING AND EVALUATING REQUESTS FOR INSURANCE PROPOSALS

(75) Inventors: James S. Rogers, Willington, CT (US); James Daniel Scott, Manchester, CT (US); Rozalyn G. Murphy, Hebron, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 532 days.

(21) Appl. No.: 12/486,903

(22) Filed: Jun. 18, 2009

(65) Prior Publication Data

US 2010/0324942 A1 Dec. 23, 2010

(51) Int. Cl.
*G06Q 40/00* (2012.01)
*G06Q 40/08* (2012.01)

(52) U.S. Cl.
CPC ..................... *G06Q 40/08* (2013.01)
USPC ......... 705/4; 705/38; 705/39; 705/37; 705/40

(58) Field of Classification Search
USPC ................. 705/4, 24, 36–38, 35, 40; 715/239
See application file for complete search history.

(56) References Cited

U.S. PATENT DOCUMENTS

| | | | |
|---|---|---|---|
| 6,839,714 B2 | 1/2005 | Wheeler et al. | |
| 6,928,487 B2 | 8/2005 | Eggebraaten et al. | |
| 7,257,647 B2 | 8/2007 | Katz et al. | |
| 2002/0042835 A1 | 4/2002 | Pepin et al. | |
| 2002/0103678 A1* | 8/2002 | Burkhalter et al. | 705/4 |
| 2002/0111725 A1* | 8/2002 | Burge | 701/29 |
| 2002/0198743 A1* | 12/2002 | Ariathurai et al. | 705/4 |
| 2004/0153362 A1* | 8/2004 | Bauer et al. | 705/10 |
| 2005/0055249 A1* | 3/2005 | Helitzer et al. | 705/4 |
| 2005/0182668 A1 | 8/2005 | Debber | |
| 2007/0214020 A1* | 9/2007 | Srinivasan et al. | 705/4 |
| 2008/0005356 A1 | 1/2008 | Katz et al. | |
| 2008/0065427 A1* | 3/2008 | Helitzer et al. | 705/4 |
| 2008/0077451 A1* | 3/2008 | Anthony et al. | 705/4 |
| 2008/0221936 A1* | 9/2008 | Patterson | 705/4 |
| 2009/0024639 A1 | 1/2009 | Steinmann | |
| 2009/0037228 A1 | 2/2009 | Engel | |
| 2009/0119133 A1 | 5/2009 | Yeransian et al. | |
| 2011/0022419 A1 | 1/2011 | Ziade et al. | |

* cited by examiner

*Primary Examiner* — Tien Nguyen

(74) *Attorney, Agent, or Firm* — Howard IP Law Group, PC

(57) ABSTRACT

A computer system for receiving and evaluating requests for quotes for insurance services includes a processor; and a memory storage device in communication with the processor. The processor is adapted to: receive via a communications interface data including a request for a quote to provide insurance services with respect to a first risk; verify and augment the received data with respect to one or more sources of data; determine based on the verified and augmented received data whether a quote will be provided with respect to the first risk; and provide an output signal including the received data and at least a portion of the augmented data to a third party server.

29 Claims, 8 Drawing Sheets

SYSTEM AND METHOD FOR RECEIVING AND EVALUATING REQUESTS FOR INSURANCE PROPOSALS

FIELD OF INVENTION

The present invention relates to computer systems, and particularly to computer systems for receiving and evaluating inquiries, such as requests to provide proposals for underwriting risks.

BACKGROUND

In the insurance field, such as in the field of property/casualty insurance for businesses and consumers, agents work with the customer to identify insurance carriers and products of possible interest to the customer. The agent may logon, through an agency management computer system, sequentially to a web portal of each carrier of interest. The agent then keys in data concerning the customer and the requested coverage to each carrier through their respective portals. After receiving the data, each carrier may separately respond with a quote or with an indication that the carrier will not provide a quote. The carrier's system may find that the data provided is incomplete or inaccurate, and provide in response an error message, requiring the agent to re-enter the data, or to conduct follow up inquiries with the customer.

Multi-carrier websites receive data from agents and convey the data to multiple carriers, so that the customers may receive multiple quotes. The multi-carrier website determines the information that is provided to each carrier.

SUMMARY

In one embodiment, a computer system for receiving and evaluating requests for insurance quotes includes a processor and a memory storage device in communication with the processor. The processor is adapted to: receive via a communications interface data including a request for a quote to underwrite a first risk with respect to a potential insured; access a data source via the communications interface, and verify and augment the received data with respect using data in the data source; determine based on the verified and augmented data whether an opportunity exists for underwriting a second risk with respect to the potential insured; determine whether a quote will be provided with respect to either the first risk or the second risk; responsive to determining that no quote will be provided with respect to the first risk, provide an output signal via the communications interface, the output signal including the received data and at least a portion of the augmented data, to a third party server.

In an embodiment, a computer system for receiving and evaluating requests for insurance quotes includes a processor; and a memory storage device in communication with the processor. The processor is adapted to: receive via a communications interface data including a request for a quote to provide insurance services with respect to a first risk; validate and enhance the received data with respect to one or more sources of data to obtain enhanced request data; determine based on the validated and enhanced data whether a quote will be provided with respect to the first risk; and provide an output signal including the received data and at least a portion of the enhanced data to a third party server.

In an embodiment, a computer-implemented method for receiving and evaluating requests for insurance quotes includes receiving via a communications interface data including a request for a quote to provide insurance services with respect to a first risk; accessing via the communications interface one or more sources of data to validate and augment the received data; determining by processor based on the validated and augmented received data whether a quote will be provided with respect to the first risk; and providing via the communications interface an output signal including the received data with at least partial augmentation to a third party server.

In an embodiment, a system for receiving and responding to requests for quotes includes an authentication module for authenticating credentials of an originator of a request; a data verification module for verifying and enriching data associated with the request; an underwriting engine interface module for furnishing the verified and enriched data to an underwriting engine and for receiving a quote from the underwriting engine; a communications module for communicating verified and enriched data to a third party server, for receiving one or more third party quotes from the third party server, and for communicating the underwriting engine quote and third party quotes to the originator.

In an embodiment, a computer-readable medium has instructions thereon for receiving and evaluating requests for insurance quotes, which instructions, when executed by a processor, cause the processor to: receive via a communications interface data including a request for a quote to provide insurance services with respect to a first risk; verify the received data with respect to one or more sources of data; augment the received data with respect to the one or more sources of data; determine based on the verified and augmented received data whether a quote will be provided with respect to the first risk; and provide an output signal including the received data and at least a portion of the augmented data to a third party server.

In an embodiment, a system for receiving and evaluating requests for insurance quotes includes a first computer system having a first processor; a first memory storage device in communication with the first processor; and a first communications interface for connecting the first computer system to a network; and a second computer system having a second processor; a second memory storage device in communication with the second processor; and a second communications interface for connecting the second computer system to the network. The first processor is adapted to: receive via the communications interface data including a request for a quote to provide insurance services with respect to a risk; validate and augment the received data with respect to one or more sources of data to obtain validated and augmented data; determine based on the validated and augmented received data whether a quote will be provided with respect to the risk; and provide an output signal including enhanced request for proposal data including the received data and at least a portion of the validated and augmented data via the network to the second computer system. The second processor is adapted to furnish to a plurality of carrier computer systems data including requests for quotes based on the enhanced request for proposal data, to receive quotes from the carrier computer systems, and to furnish the received quotes to the first computer system. The first processor is further adapted to return the received quotes to the source.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for receipt and evaluation of applications for insurance. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
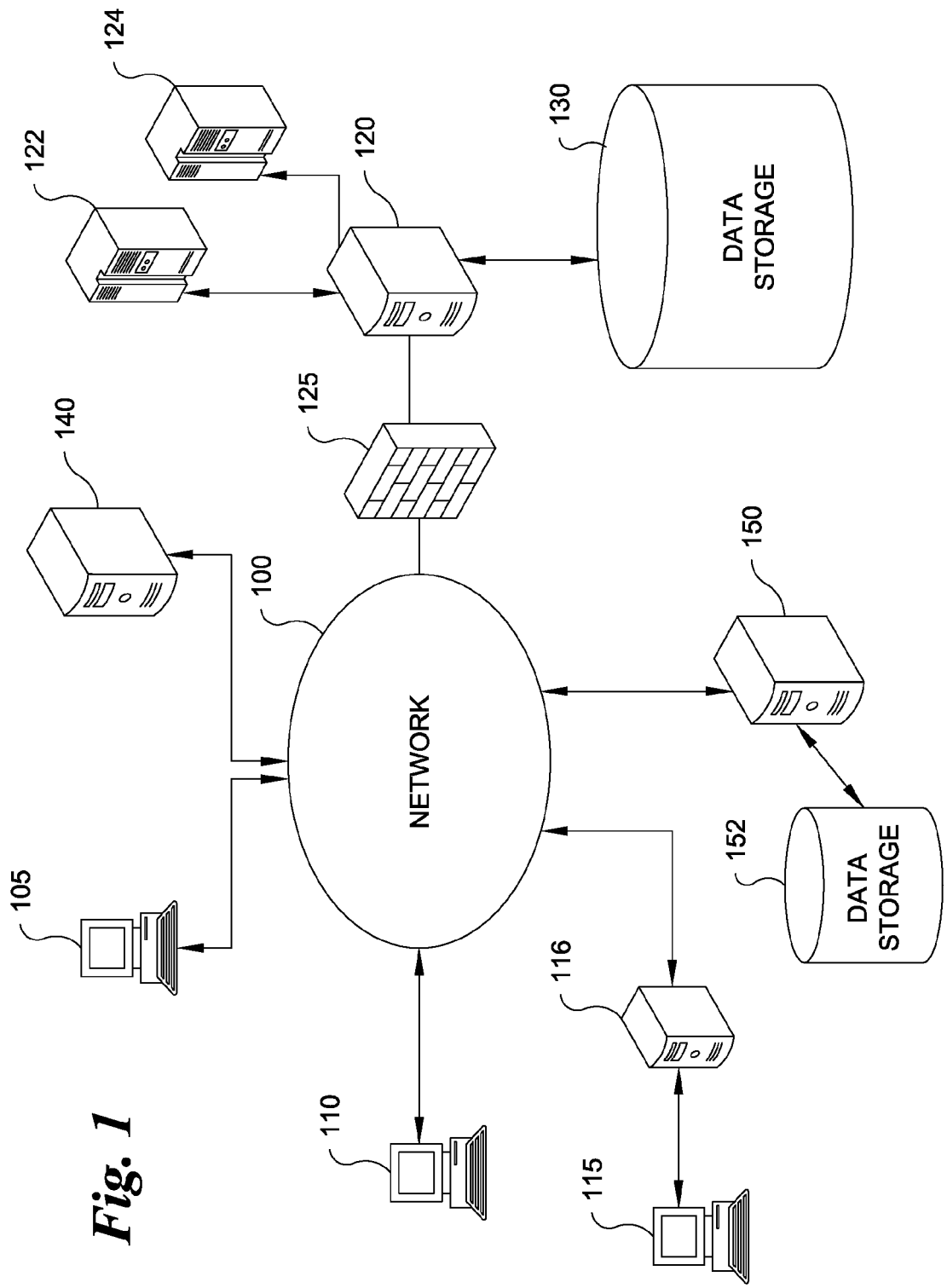
FIG. 1 is a schematic diagram of an exemplary computer network for implementation of a method and system of the invention.

Referring to FIG. 1, an exemplary network configuration is shown. Network 100 connects various computer systems and devices. Network 100 may be or include any type of network, including a local area network (LAN), a wide area network (WAN), an intranet, the Internet, a public switched telephone network (PSTN) or other network. Network 100 may employ any suitable data protocols.

Computer systems 105, 110 are in communication with network 100. Computer systems 105, 110, 115 may be exemplary of any suitable computer system. In an embodiment, system 105 may be an agency management platform; system 110 may also be an agency management platform. System 115 may be a computer system of a consumer or business, in communication with server 116 which may be a server providing a multi-carrier website. Systems 105, 110, and 116 may be configured to provide suitably formatted data to transmit requests for quotes for providing insurance services with respect to particular risks.

Firewall 125 may be configured to provide data security services with respect to systems and networks, including exemplary server 120 and data storage 130. In an embodiment, the devices protected by firewall 125 may be systems of an in insurance carrier. Server 120 may have a processor that is configured or configurable to receive data, such as requests for quotes to insure particular risks, and to verify, validate, enhance and augment data in the received requests by accessing one or more sources of data. Server 120 may access sources of data including internal sources of data such as data storage 130. Server 120 may access sources of data via a communications interface connected to a network, such as network 100. Server 120 may access third party sources of data, such as by accessing data storage 152 via network 100 and third party server 150. Server 120 may provide received requests, with data that has been validated, verified, corrected, enhanced and/or augmented, to a mainframe 122 which may serve as an underwriting engine. Mainframe 122 may return quotes to server 120. Server 120 may provide output signals including responses, such as quotes to underwrite particular risks, requests for additional information, or an indication that the carrier declines to provide a quote, to systems 105, 110 and server 116, which may pass the response or reformat the data, to system 115. Server 140 may be, by way of example, a server for a system for receiving requests for insurance quotes, and for returning quotes from multiple carriers. Server 120 may transmit data to server 140 via network 100, the data including validated, verified, enhanced or augmented data, in whole or in part. Server 120 may receive a signal indicating acceptance of a proposal or quote from systems 105, 110 and 116, and provide a signal to policy generation mainframe system 125 to generate insurance policy documents.

In embodiments, a network or data processing network, such as network 100, may be employed which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor for enable and facilitating plan setup and administration. The networks may also include mainframe computers or servers, such as a gateway computer or application server. A gateway computer serves as a point of entry into each network. The gateway may be preferably coupled to another network by means of one or more communications links. The gateway may also be directly coupled to one or more workstations using a communications link. The gateway computer may also be coupled to a storage device for storing information related to requests for proposals for insurance coverage, i.e., for underwriting of risks, and proposals, including quotes, for insurance coverage, as well as other data. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Figure 2:
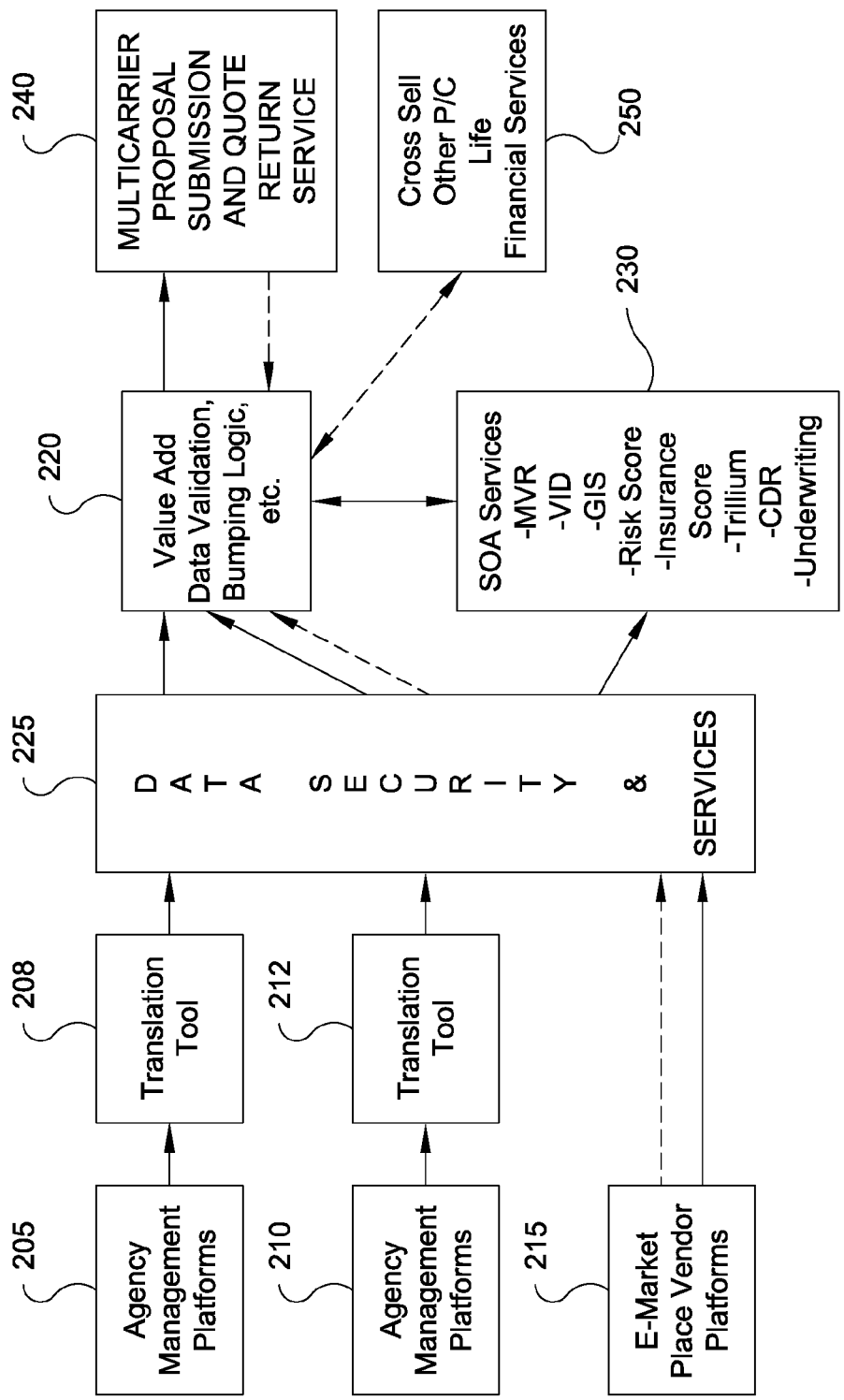
FIG. 2 is a schematic diagram of the network of FIG. 1, showing an exemplary network for implementation of a method and system of the invention.

Referring now to FIG. 2, a schematic diagram is provided showing systems that may be implemented in a network such as that illustrated in FIG. 1. Agency management platform 205 may be software and hardware that provide functionality for many or all operations of insurance agencies, for example. Such systems may include code for generating user interfaces to input data in connection with a request from a client for a quotation for insuring a particular risk. Depending on the type of risk, the location, and numerous other factors, the system may provide a particular set of questions or forms to be completed. The system 205 may receive the data from a user and provide an output signal in AL3 format, for example. The AL3 data format is a data format used by mainframe computer systems for insurance-specific data. A data formatting tool 208, such as the TransactNow tool from Vertafore, may receive the data in AL3 format and reformat the data in ACORD XML format. The ACORD XML format data may be provided to data security and services 225, which, as described in greater detail below, provides firewall functions, such as user authentication, virus checking, and may also provide services related to data management and calling of services.

Computer system 210 may be an agency management platform from Applied Systems. This agency management platform has a similar functionality to that of computer system 205. Requests for quotes output by computer system 210 may be in TS XML data format. A format translation tool 212 may receive quotes in TS XML data format and output the requests to data security and services 225 in ACORD XML data format. Format translation tool 212 may be IVANS Transformation Station, by way of non-limiting example.

Computer system 215 may be a system for administration of an e-commerce website for receiving, such as over a network from consumer and business computer systems, requests for quotes for insurance services, and for providing quotes from multiple carriers. Computer system 215 receives requests for quotes from insurance agents, businesses seeking insurance for themselves and from individuals. Computer system 215 may format the request for quote data in ACORD XML format and provide the data to data security and services 225.

Data security and services 225, upon receiving data from computer systems 205, 210, 215, may perform various tasks related to providing firewall services, such as identifying malicious code and taking appropriate steps to remove the code or isolate data containing the malicious code. Data security and services 225 may also perform services related to authentication of credentials presented by users, translation of data between formats, routing of data, and calling of services. Data security and services 225 may accordingly serve as an authentication module. If appropriate, data security and services 225 permits data to be passed to server 220, which may perform analyses of the data.

Server 220 may include one or more processors and memory devices having code stored therein, which code, when executed by a processor, causes the processor to perform functions including validating and verifying received data by comparing received data with data in one or more sources of data, and of augmenting, enhancing and enriching received data with additional information from one or more sources of data, such as computerized databases. The sources of data may be local sources of data to server 220, may be on a carrier's internal network, or may be accessed via requests passed over a network, such as the Internet, to a third party server. Server 220 may serve as a data verification and validation module. The term "module," as used herein, includes computer hardware, including processors and memory devices, having loaded program code causing the processor and other devices to perform particular functions. Validation functions may include applying business rules to determine whether the received data are internally consistent and complete. Validation functions may also include verifying the accuracy of data against one or more sources of data, which may include one or more databases internal to the carrier or external databases accessed over a network. Server 230 is in communication with server 220, and may provide SOA functionality, including accessing various databases for purposes of validating, verifying, enhancing, enriching and/or augmenting received data. For example, for requests for proposals for automotive insurance, server 230 may include modules for accessing one or more sources of data including databases having motor vehicle records (MVR) and vehicle identification (VID) data. Server 230 may include business rules that result in accessing one or more sources of data depending on the type of risk for which a proposal is sought. By way of example, business rules may specify, for a variety of risks, that server 230 will access geographic data, which may be referred to as geographic information services (GIS).

The received data may also be augmented, enhanced and enriched by adding data not contained in the request to provide a proposal. Such additional or augmented data may include data from any of the databases noted above. By way of example, a database having risk scores, if applicable, may be accessed. Various types of risk scores, such as insurance risk scores associated with individuals, and flood risk scores, are known in the art. An insurance score, which may also be associated with an individual, may be accessed from a database. Tools such as those commercially available from Trillium Software Systems for data cleansing and standardization may be employed. Business rules may provide that server 230 accesses CDR data.

Server 230 may serve as an underwriting interface module by providing data to a mainframe underwriting engine, and receiving quotes returned from the mainframe underwriting engine. The data provided to the mainframe underwriting engine may be the received data, which data may have been corrected and validated. The data provided to the mainframe underwriting engine may also include additional data obtained through augmenting of received data with data accessed from one or more sources of data. In an embodiment, data may be provided to cross-sell module 250. The data provided to the cross-sell module 250 may be the received data, which data may have been corrected and validated. The data provided to the cross-sell module 250 may also include additional data obtained through augmenting of received data with data accessed from one or more sources of data. Cross-sell module 250 may apply business rules to received data to identify additional insurance products and services that may be possible to offer. For example, the business rules may provide, for a request for a proposal for one type of property/casualty insurance, that a proposal for a second type of property/casualty insurance be returned. By way of example, a request for a proposal to provide a first type of property/casualty insurance, such as business property insurance may be received. The business location may be determined using GIS data, and compared to flood zone data. If the business location is determined to be in a flood zone, a proposal to provide a second type of property/casualty insurance, in this example flood insurance, may be returned. In the alternative, data advising an agent or other user that flood insurance may be available and inviting a request for a proposal may be returned. Requests for proposals for any type of property/casualty insurance may return a proposal for any other type of property/casualty insurance. Examples of business property casualty insurance include: business automobile; capital assets; crime and fidelity; electronic commerce; equipment breakdown; general liability; inland marine; management protection; professional liability; real and personal property; and workers compensation. A request for proposal for any of these exemplary types of property/casualty insurance may result in a proposal for any of these exemplary types of property/casualty insurance. By way of further example, the rules may provide that a request for a proposal to provide property/casualty insurance, such as business property insurance, may result in a proposal for group benefits insurance, life insurance or financial services. For example, business rules applied to a request for business property insurance may result in a proposal for providing services related to a 401(k) plan for a business. If regulations in a particular state require an employer to provide life insurance when workers' compensation insurance is provided, then the cross-sell module 250 may apply business rules on receipt of a request for a proposal to provide workers' compensation insurance from a customer in that state, and provide an output signal resulting in a communication informing the agent of the requirement and requesting additional information needed to provide a life insurance quote. By way of further example, the business rules applied by module 250 may provide that, in response to a request for proposal for workers compensation insurance, a proposal or a communication to provide further information for group benefit insurance, may be provided. Group benefit insurance may include disability coverage, term life insurance, and accidental death and dismemberment insurance.

Server 220 may respond to the source of the request for proposal with an inquiry as to whether the source consents to providing data from the request to a third party, such as a different carrier's computer system or a computer system of a multi-carrier interface 240. The data provided to the different carrier's computer system or multi-carrier interface 240 may include the received data, which may include the received data with corrections. The data provided to the different carrier's computer system or a multi-carrier interface 240 may include a portion of the additional data obtain from one or more sources of data noted above. The data may be provided to the multi-carrier interface 240 in ACORD XML format, by way of example. The multi-carrier interface 240 may in turn pass the data to one or more third party carriers for review and possible return of a quote. The multi-carrier interface 240 may return one or more quotes in ACORD XML format, by way of example. The returned quotes from the multi-carrier interface may be returned, in accordance with instructions contained in computer program code and performed, for example, by carrier 220, to the originating systems, such as agency management platforms 205, 210, or e-marketplace vendor platforms 215. Similarly, another carrier's system may return quotes which are in turn returned, in accordance with instructions contained in computer program code and performed, for example, by carrier 220, to the originating systems, such as agency management platforms 205, 210, or e-marketplace vendor platforms 215. The quotes from the multi-carrier system or the another carrier's system may be returned to an originator, such as an agency management system, together with one or more quotes returned from the mainframe underwriting engine.

Figure 3:
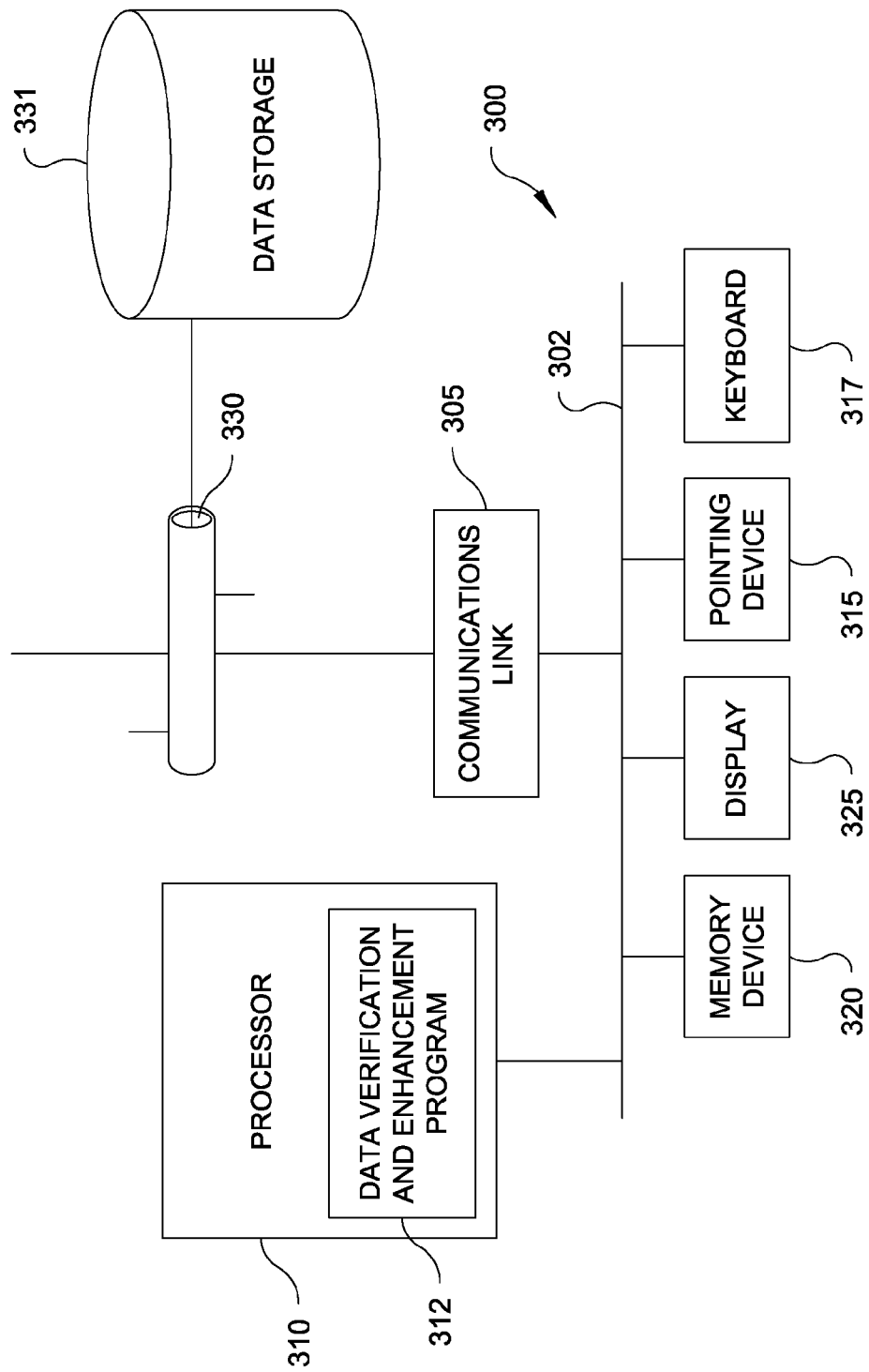
FIG. 3 is a schematic diagram showing an exemplary computer system for use in the embodiments of FIGS. 1 and 2.

Referring now to FIG. 3, a schematic diagram illustrates an exemplary computer system for use in the embodiments of FIGS. 1 and 2. In computer system 300, processor 310 executes instructions contained in programs such as data verification and enhancement program 312. Programs may be stored on suitable media, such as optical or magnetic disks, fixed disks with magnetic storage (hard drives), tapes accessed by tape drives, and other storage media. Processor 310 communicates, such as through bus 302 and/or other data channels, with communications port 305 and memory device 320, receives data from user inputs 315, and provides data to outputs 325. Memory device 320 is configured to exchange data with processor 310, and may store programs containing processor-executable instructions, and values of variables for use by such programs. User input may be provided at inputs 315, which may include keyboards, pointing devices such as mice, and touch screens. In an embodiment, inputs 315 may include user interfaces, including workstations having keyboards, touch screens, pointing devices such as mice, or other user input devices, connected via networked communications to processor 310. Outputs 325 may include displays and printers. By way of non-limiting example, one or more programs may cause outputs 325 to display data relating to requests for proposals to human operators. Human operators may provide inputs in response to prompts to, for example, determine whether to provide a proposal for underwriting a risk. Communications port 305 may communicate with remote sources of information, and with systems for implementing instructions output by processor 310, via LAN 330. LAN 330 is merely exemplary, and communication may be by one or more of suitable communication methods, including over wired or wireless local area networks and wide area networks, and over communications between networks, including over the Internet. Any suitable data and communication protocols may be employed. Data storage 331, which may include a wide variety of data acquired and processed in accordance with embodiments, is accessed via LAN 330.

Figure 4:
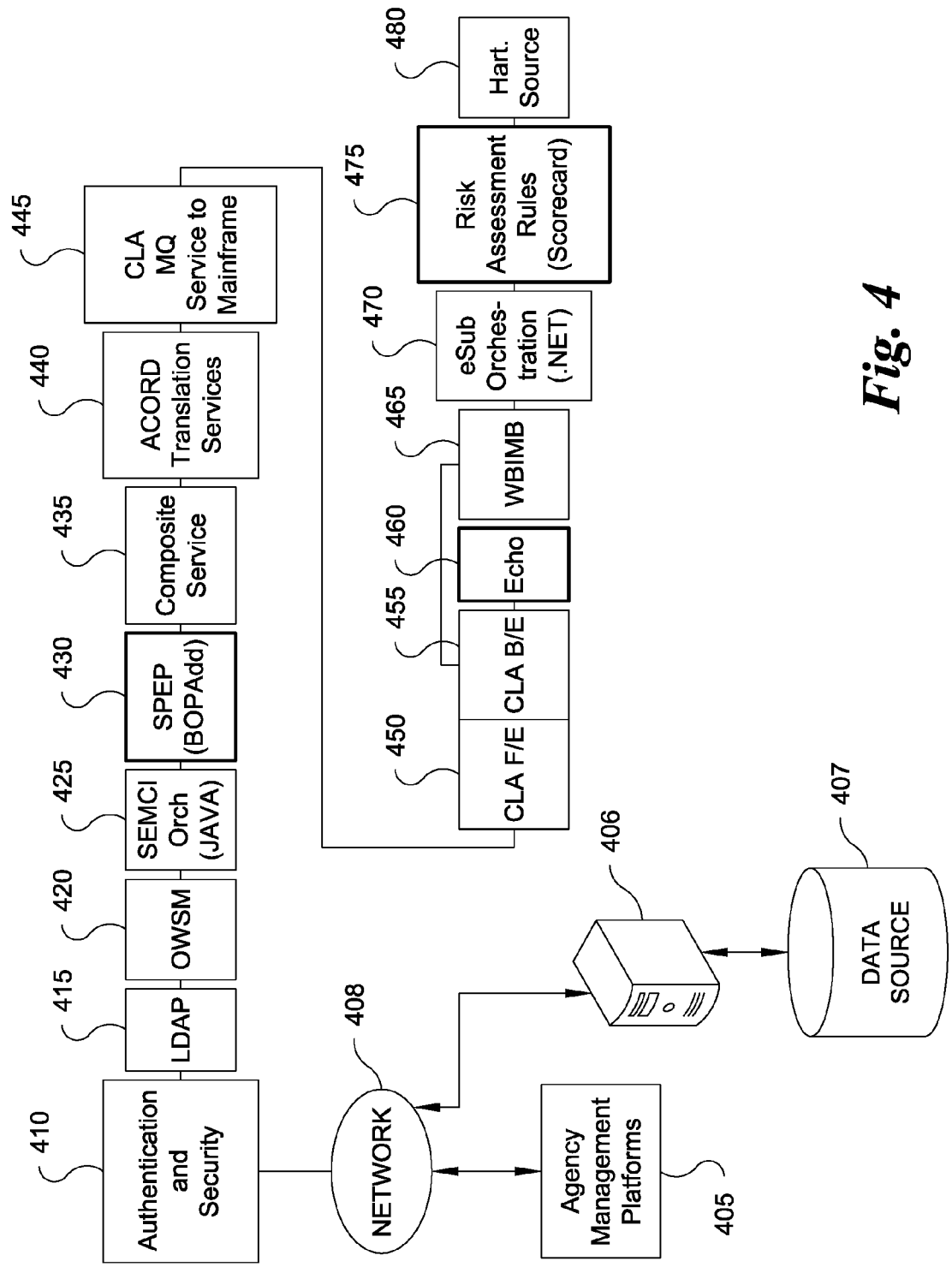
FIG. 4 is a schematic diagram illustrating components in a system for implementation of an embodiment of the invention.

Referring to FIG. 4, components of a system will be explained in greater detail. Exemplary systems and databases that communicate via network 408 with a carrier's system are shown at 405, 406, 407. By way of example, agency management platforms 405 may communicate over network 408. Server 406 is exemplary of servers that may receive requests from a carrier's system for access to an exemplary data source 407. Authentication and security device 410, which serves as a SEMCI gateway, controls the passage of data between external networks and the internal data functions. Authentication and security device 410 may verify user credentials against data authenticated using LDAP 415. An orchestration service, such as Oracle web services manager (OWSM) 420, may be provided. OWSM 420 applies rules, depending on the received transaction, to determine various services to call, and may also perform session management services between the services until a result is returned. SEMCI orchestration 425 calls appropriate services depending on instructions received from OWSM 420. SPEP 430 is a service called by SEMCI orchestration 425. SPEP 430 may perform validation, enhancement and enrichment services, such as running received data against rules to determine internal consistency, and comparing received data to data in external data sources, such as data source 407. Composite service 435 is also called by SEMCI orchestration 425. ACORD translation services 440 translate data in messages between various formats, such as between ACORD XML and AL3. CLA MQ service 445 provides MQ format messages to communicate with a mainframe computer system, such as mainframe computer system 122 of FIG. 1. CLA front end 450 represents a front end application running on a mainframe, and CLA back end 455 represents a back end application running on a mainframe. CLA back end 455 may serve as an underwriting engine to provide quotes. Echo 460 is a service that stores any changes in data associated with a received business message. WebSphere Business Integration Message Broker (WBIMB) 465 performs management services for business messages. eSub Orchestration 470 may perform further service orchestration services. Risk assessment rules module 475 applies various rules to the updated and enhanced request for proposal and provides as an output a score. The score may be employed by an operator to determine whether to provide a proposal. If a proposal is to be provided, then the data is provided to underwriting system 480.

Figure 5:
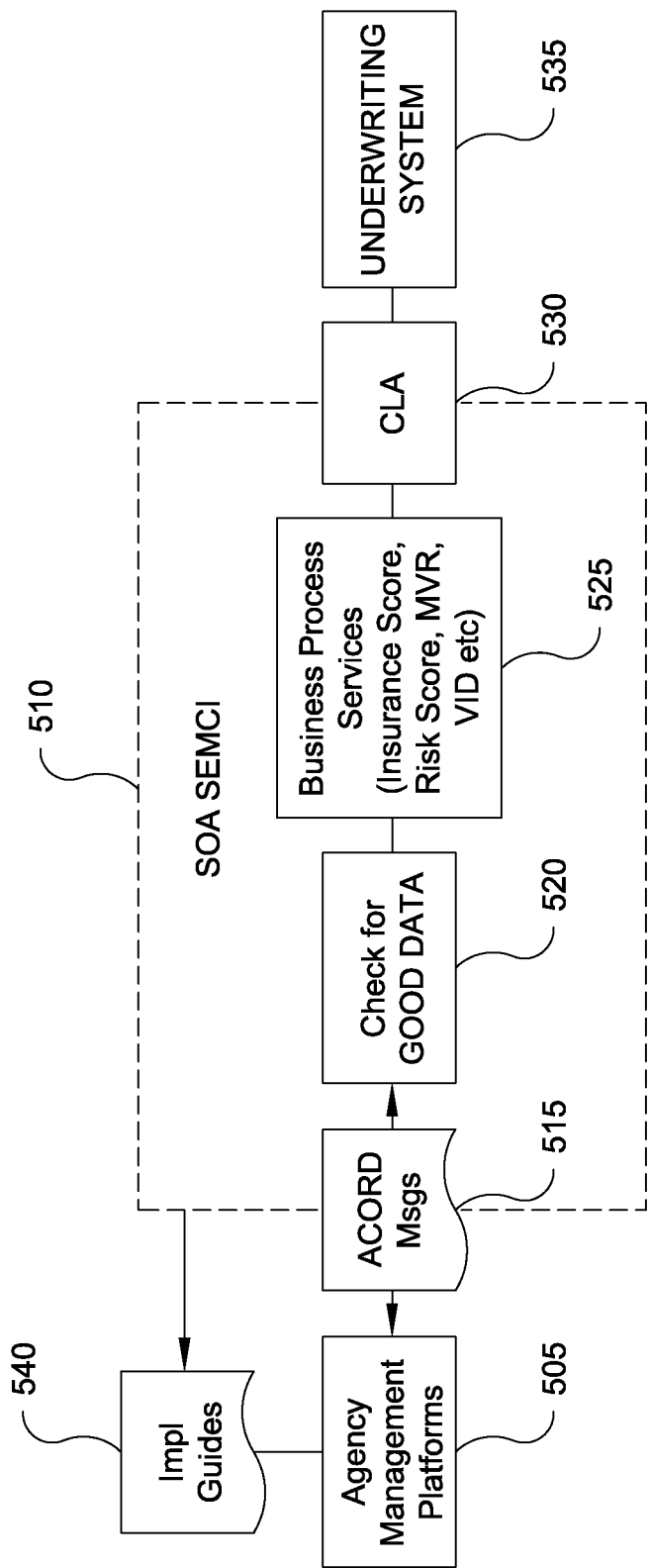
FIG. 5 is a schematic diagram showing components of an alternative system for implementation of an embodiment of the invention.

Referring now to FIG. 5, a schematic diagram of an arrangement for receipt and processing of requests for proposals for insurance coverage, which may be implemented on the network hardware shown in FIG. 1, will be described. Agency management platforms 505 provide messages in a suitable format that may be converted to ACORD XML to provide ACORD messages 515. In addition to agency management platforms, messages may be provided from insurance websites that cater directly to consumers or small business, and other consumer front end services. The SOA SEMCI block 510 represents generally the various services that receive ACORD format messages 515 and perform data verification and enhancement functions. At block 520, processes generally referred to as check for good data are performed. These processes may include applying business rules to the received data to determine if the data are internally consistent and complete for the type of coverage requested. At block 525, business process services are performed. These processes may include verification of furnished data, such as verification of data against motor vehicle records (MVR), vehicle identification (VID) databases, and geographical information systems (GIS). Additional data may be obtained, such as insurance score data and risk score data for individuals. These services may access external sources of data over a network. The data, which may include corrected data and augmented and enhanced data, may be passed to CLA 530, which may include web services and a mainframe back end. CLA 530 may perform underwriting analyses and assign one or more scores to a proposal. CLA 530 may pass the data to underwriting system 535. Underwriting system 535 may perform analyses and provide pricing for a policy. Pricing may then be returned by CLA 530 to SEMCI 510, which generates a return message with a proposal, an indication that no proposal will be provided, and may further include enhanced or corrected data, and a request for approval to pass the data to a third party. SEMCI 510 may further publish implementation guides 540 to the agency management systems 505. Implementation guides may include electronic forms and questionnaires to facilitate the entry of required information by agents.

Figure 6:
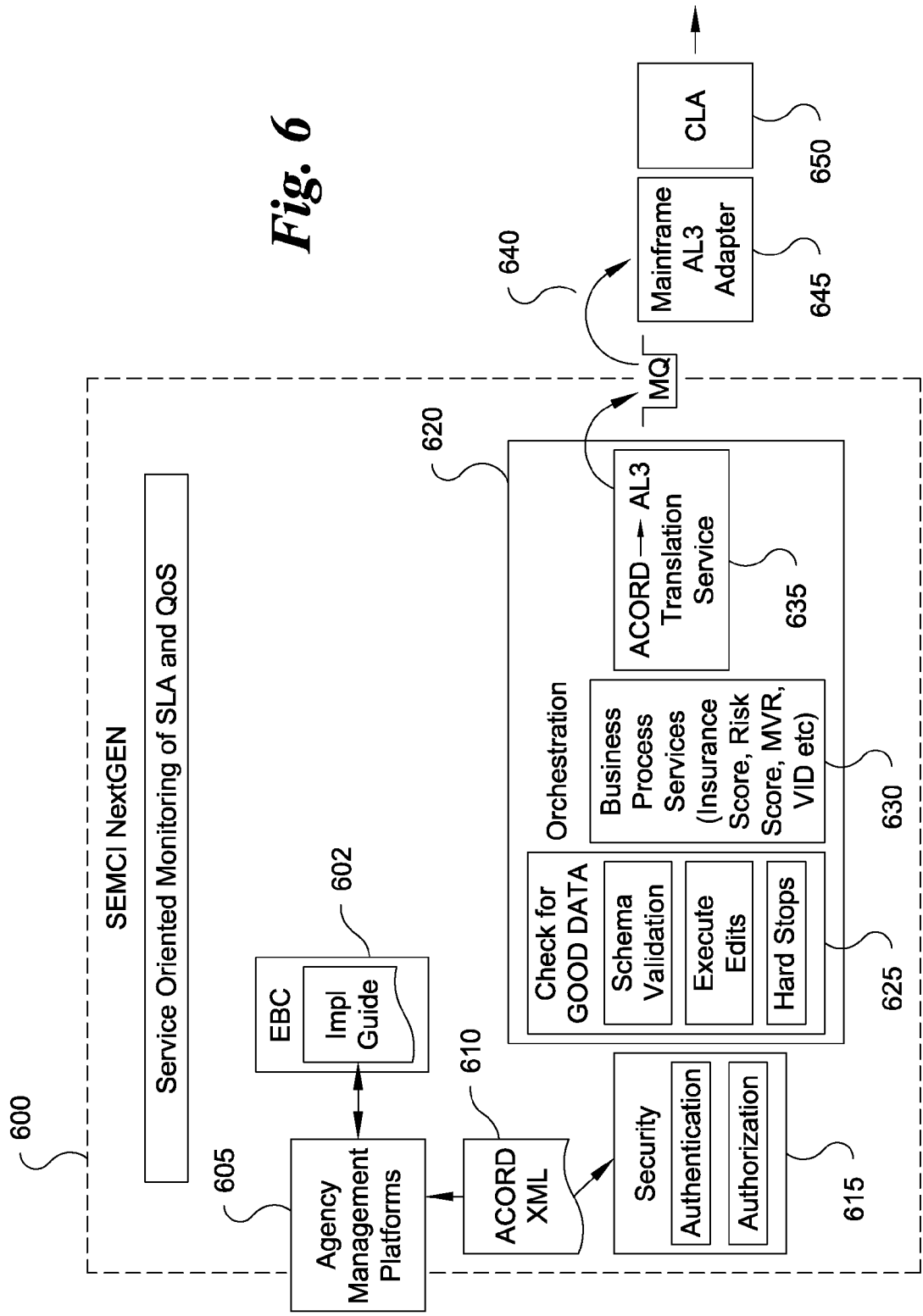
FIG. 6 is a schematic diagram showing components of another alternative system for implementation of an embodiment of the invention.

Referring now to FIG. 6, a schematic illustration of functionality in another embodiment is provided. Agency management platforms 605 are shown generally. Agency management platforms provide requests 610 for proposals using an ACORD data format, such as an ACORD XML format. Data received are subject to analysis by a security function 615. Security function 615 may include authenticating credentials and confirming that a user is authorized by the agency management platform to interact with the system. A security function 615 may further include facilities for detection of viruses and other malicious code. An orchestration function 620 calls various services to provide various functions with respect to received data. A check for good data function 625 may be called and include validating schema, such as determining internal consistency of furnished data. Data may be edited for internal consistency and for consistency with data obtained from sources of data, such as internal and external databases. Rules may be executed on the data that provide for a hard stop of the analysis and returning a result to the agency system. For example, if the data provided is missing required data items, or if one or more required data items is not consistent with data in one or more data sources, and the data cannot be reconciled, then a rule may provide for a hard stop of the analysis. Various services may be called to provide validation services indicated at block 630. As noted above, these services may access one or more sources of data, which may be local, accessed over a carrier's intranet, and/or third party sources of data accessed over one or more external networks. Data, which may be corrected and include enhanced and/or augmented data, may be formatted in an ACORD format message which is translated to an AL3 format message by ACORD to AL3 translation service 635. An AL3 format message is provided to a message queue MQ 640, which passes the AL3 format message to mainframe AL3 adapter 645. Mainframe AL3 adapter 645 in turn communicates with mainframe system 650. The mainframe system 650 serves as an underwriting engine and generates a quote for the requested coverage and returns a quote in AL3 format. The quote may be converted from AL3 format to ACORD XML or another suitable format, passed by the orchestration function through the security functionality 615 to the originating agency management platform 605. In an embodiment, EBC 602 may publish implementation guides to agency management platforms 605 to provide identification of required data items and frameworks for submission of data. In an embodiment, a quote and/or data may be passed to a third party multi-carrier server.

Figure 7:
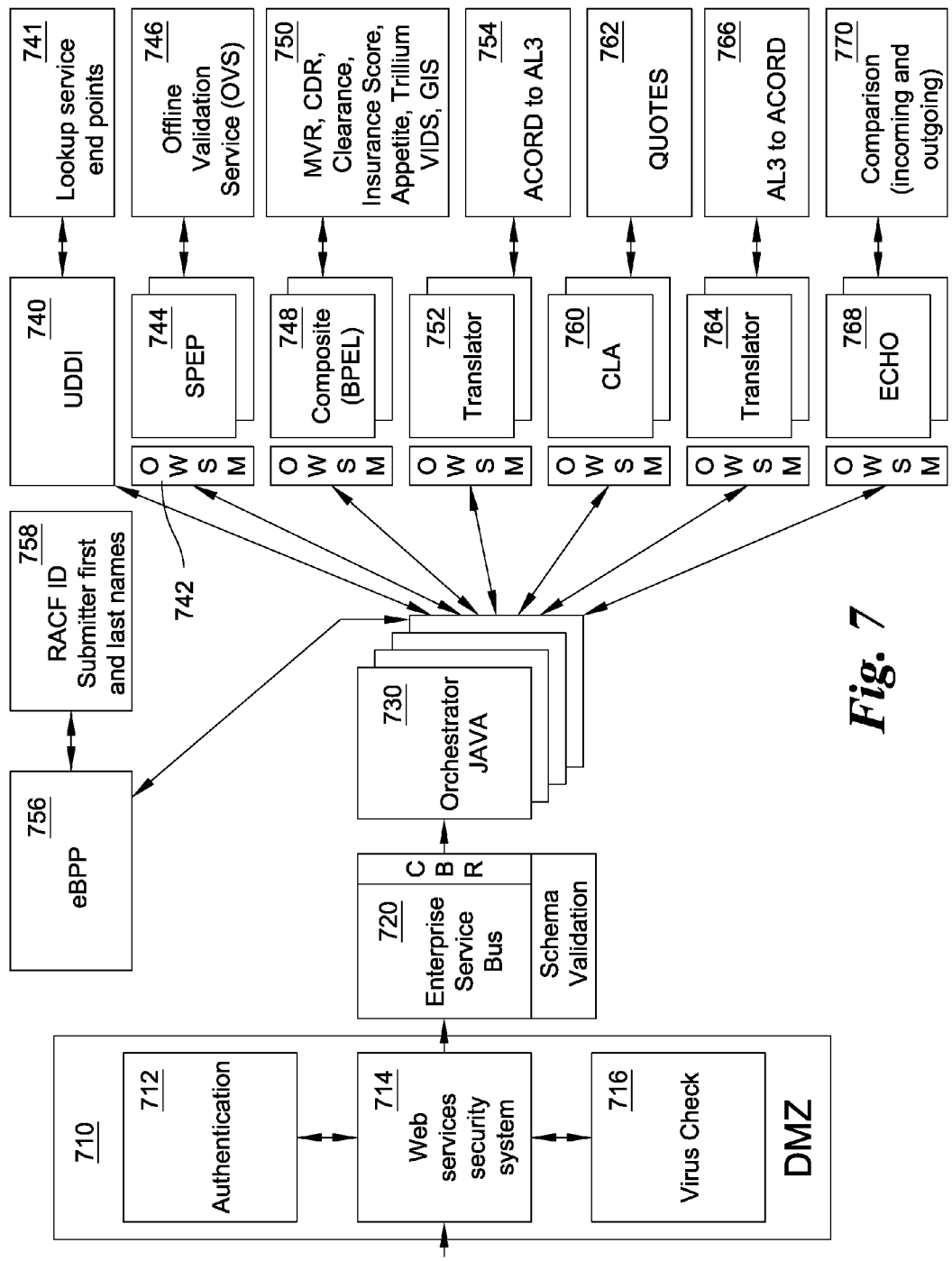
FIG. 7 is a schematic diagram showing components of another alternative system for implementation of an embodiment of the invention.

Referring to FIG. 7, an example of an implementation of a system in accordance with an embodiment is shown. ACORD XML messages are generated by agency management systems (not shown), and may be posted to a security zone 710. Security zone 710 may be implemented by web services security system 714, which may be, by way of example, a system implemented on distinct hardware, such as the Datapower XS 40 available from IBM. Web services security system 714 may perform authentication 712, to determine whether the person initiating the ACORD XML message has proper authority. Web services security system 714 may also perform a virus check 716 and other security-related services. If the message fails to pass the security tests, a return message may be provided to the originating device. If the message passes the security and authorization tests, the message may be attached in SOAP format as a SOAP attachment and passed to an enterprise service bus 720. Enterprise service bus 720 may be implemented in a variety of hardware and software configurations, including the Datapower XI 50 hardware device from IBM. The enterprise service bus 720 performs schema validation on the message to verify that the message is in a format that can be read by SEMCI. If the message is in an appropriate format, the type of message is determined. In one example, the message type may be Auto Quote. Other message types may be determined by the type of insurance quote requested. For example, different message types may be provided for quotes for commercial property insurance, comprehensive general liability insurance, homeowners insurance, workers compensation, and life insurance. A business message may be formatted in a suitable manner, such as in the format of an attachment.

An orchestrator 730 may be called. Each message type may map to a different orchestrator, in an embodiment. Each orchestrator 730 has a set of rules for routing of data items from the message to particular services. Orchestrator 730 may be Java based. In the illustrated embodiment, orchestrator 730 may call a registry, such as Universal Description, Discovery and Integration (UDDI) 740 to obtain addresses and protocols for service end points 741 to access various data sources. Orchestrator 730 may employ a web services manager, such as Oracle Web Services Manager (OWSM) 742 to provide session management services. Orchestrator 730 may call service provider enforcement point (SPEP) 744, which performs validation services 746. SPEP 744, which may be Java-based, may check for edits and runs rules on the message data for internal consistency and error checks. The results of the SPEP service 744 are passed back to orchestrator 730.

The process flow proceeds to orchestrator 730 calling, and using OWSM for session management, composite service 748. Composite service 748 may be based on Business Process Execution Language (BPEL), rather than Java. Composite service 748 in turn calls a number of services 750 to access various databases. For example, CDR, Experian and insurance score services may be called to obtain data regarding the proposed client. Composite service 748 may simultaneously call services such as vehicle identification (VID) and motor vehicle registration (MVR) for validation of data. Composite service 750 may further access geographic information services (GIS). Composite service 750 may serve as a data verification, validation, augmentation and enhancement module. An appetite service may be called to provide an indication as to whether the carrier is interested in underwriting the risk. For example, the carrier may have sufficient exposure in a particular category of risk, such as property risks in a particular zip code or other geographic area, to determine that there is no appetite for further property insurance in that zip code. The appetite service may serve as an appetite module. The data obtained by services 750 is returned to composite service 748. Composite service 748 may compile the results and provide the response to orchestrator 730.

The process flow may continue by a call from orchestrator 730 to eBPP service 756 to obtain submitter data 758 including resource access control facility identification (RACF ID) and first and last names. eBPP service returns this data to orchestrator 730. Orchestrator 730 then may output a business message in ACORD XML format and including corrected and enhanced data to translator service 752, which performs translation of the message from ACORD XML to AL3 754. Translator service 752 may call enterprise service bus 720 to perform data transformation. The AL3 format message is provided by orchestrator 730 to CLA service 760. CLA service 760 in turn calls a mainframe, using, e.g., Web Sphere Business Integration Message Broker from IBM, which mainframe generates a quote 762. CLA service 760 and translator services 752, 764, together with a processor executing instructions, may serve as an underwriting engine interface module. The quote is returned in AL3 format. Orchestrator 730 calls translator service 764, which causes the AL3 message to be translated 766 to ACORD XML, using the enterprise service bus 720. Orchestrator 730 may provide the originally received data and the updated and validated data to ECHO service 768. ECHO service 768 compares the received XML stream with the responsive XML stream that is ready to return to the originator, and identifies the additions, deletions, and changes in the stream. The responsive XML stream is updated with the addition, deletion and change information. The orchestrator 730 then forwards the updated responsive XML stream for return to the originator.

Figure 8:
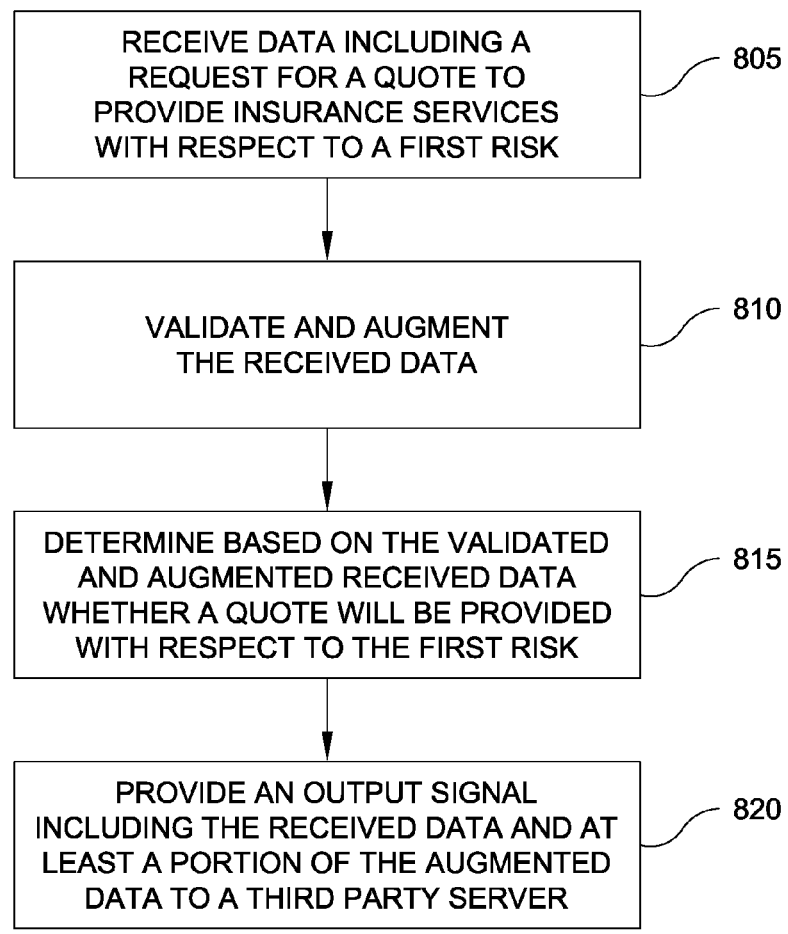
FIG. 8 is a process flow diagram of an embodiment of a method of the invention.

Referring now to FIG. 8, a process flow is shown. A processor may receive 805 via a communications interface data including a request for a quote to provide insurance services with respect to a first risk. The processor may validate and augment 810 the received data with respect to one or more sources of data. The processor may determine 815 based on the validated and augmented received data whether a quote will be provided with respect to the first risk. The processor may provide 820 an output signal including the received data and at least a portion of the updated data to a third party server.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with the invention described herein may be so implemented.

An exemplary advantage of a system and method in accordance with an embodiment is that an insurance agent may obtain quotes from more than one carrier without the need to re-enter data. A further exemplary advantage is that the data may be enhanced or corrected prior to submission to a second carrier.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system of receiving and evaluating requests to provide insurance quotes, the computer system comprising:
   a processor;
   a memory storage device in communication with the processor;
   the processor configured to:
   receive via a communications interface data including a request of a quote to underwrite a first risk with respect to a potential insured, wherein the first risk relating to vehicle coverage;
   access one or more data sources which comprises motor vehicle records (MVR) and vehicle identification (VID) databases via the communications interface, and verify and augment the received data relating to the first risk using MVR data and VID data in the data source;
   determine based on the verified and augmented received data whether: (a) to provide a quote or (b) to decline to provide a quote with respect to the first risk;
   responsive to determining to provide the quote and in response to the request, provide an output signal having the quote with respect to the first risk, and wherein the processor is further configured to:
   furnish the verified and augmented received data to an underwriting engine;
   receive the quote from the underwriting engine;
   furnish the quote in response to the request;
   receive an indication of acceptance of the quote, and provide an output signal to a policy generation system; and responsive to determining to decline to provide the quote with respect to the first risk, provide an output signal which includes the received data and at least a portion of the augmented data via the communications interface to a third party server; and wherein the third party server being configured to, responsive to the data received from the processor, return quotes from a plurality of carriers to underwrite the first risk; and wherein the processor is further configured to:

generate a return message prior to provide the received data to the third party server, wherein the return message includes the augmented data, the request of the quote, and an approval to pass the augmented received data to the third party server;

receive one or more quotes from the third party server; and provide the received one or more quotes in response to the request of the quote.

2. The system of claim 1, wherein the data in the one or more data sources includes geographic data.

3. The system of claim 1, wherein the processor is further configured to determine based on the verified and augmented data to provide a quote for a second risk distinct from the first risk or to decline to provide a quote for the second risk, wherein the second risk is for a type of property/casualty insurance other than motor vehicle coverage.

4. A computer system of receiving and evaluating requests to provide insurance quotes, the system comprising:

a processor;

a memory storage device in communication with the processor, wherein the memory storage device storing data indicative of business rules to select data sources correlated with categories of risk;

the processor configured to:

receive via a communications interface data including a request of a quote to provide property/casualty insurance coverage with respect to a first risk in a first category;

determine, based on the data indicative of business rules and the first category, one or more sources of data to access to validate and enhance the received data including a request of a quote;

access the determined one or more data sources, and validate and enhance the received data including a request of a quote based on the data accessed from the determined one or more sources of data to obtain validated and enhanced request data;

determine, based on the validated and enhanced request data with respect to the first risk, whether: (a) to provide a quote or (b) to decline to provide a quote;

responsive to determining to provide the quote and in response to the request, provide an output signal having the quote with respect to the first risk; and wherein the processor is further configured to:

furnish the verified and augmented received data to an underwriting engine;

receive a quote from the underwriting engine;

furnish the quote in response to the request;

receive an indication of acceptance of the quote, and provide an output signal to a policy generation system; and responsive to determining to decline to provide the quote with respect to the first risk, provide an output signal including the received data and at least a portion of the validated and enhanced data to a third party server, and wherein the third party server is a multi-carrier quotation server and configured to, responsive to the data received from the processor, return quotes from a plurality of carriers to underwrite the first risk; and wherein the processor is further configured to:

generate a return message prior to providing the received data to the third party server, wherein the return message includes the enhanced data, the request of the quote, and an approval to pass the enhanced received data to the third party server;

receive one or more quotes from the third party server; and provide the received one or more quotes in response to the request of the quote.

5. The computer system of claim 4, wherein the validating and enhancing the received data includes correcting the received data based on data in the one or more sources of data, and the output signal provided to the multi-carrier quotation server includes corrected received data.

6. The computer system of claim 4, wherein the validating and enhancing the received data includes adding data to the received data, and the output signal provided to the multi-carrier quotation server includes at least a portion of the added data.

7. The computer system of claim 4, wherein the processor is configured to receive one or more third party quotes from the third party server and provide the received one or more third party quotes in response to the request.

8. The computer system of claim 7, wherein the processor is further configured to, responsive to determining to provide a quote, provide an output signal including the received data and at least a portion of the validated and enhanced data to a third party server, the third party server being a multi-carrier quotation server, and receive one or more third party quotes from the multi-carrier quotation server; furnish the validated and enhanced received data to an underwriting engine, receive a quote from the underwriting engine, and provide the quote together with the one or more third party quotes in response to the request.

9. The computer system of claim 4, wherein the processor is configured to, responsive to determining to provide a quote with respect to the first risk, furnish the validated and enhanced received data to an underwriting engine, receive a quote from the underwriting engine, and provide the quote to the third party server.

10. The computer system of claim 4, wherein the processor is further configured to determine based on the verified and augmented data to provide or to decline to provide a quote with respect to a second risk distinct from the first risk.

11. The computer system of claim 4, wherein the processor is further configured to provide in response to the request an output signal including corrected data.

12. The computer system of claim 4, wherein the first category is business property insurance for a property, the data sources correlated with the first category comprise geographical information services (GIS) data, and flood zone data, and processor is further configured to determine based on the GIS data whether an opportunity exists for underwriting flood insurance for the property.

13. The computer system of claim 12, wherein the processor is further configured to return in response to the request a proposal for underwriting flood insurance for the property.

14. The computer system of claim 4, wherein the first category is business property insurance for a property, the data sources correlated with the first category comprise geographical information services (GIS) data, and the processor is further configured to determine whether an underwriting carrier has an appetite for business property insurance in a geographic area corresponding to the property, the geographic area being validated by the GIS data, to provide a response having data indicating that a proposal will not be provided responsive to determining that the underwriting carrier has no appetite for business property insurance in the geographic area corresponding to the property.

15. The computer system of claim 4, wherein the determining to provide a quote or to decline to provide a quote comprises calling an appetite service.

16. A computer-implemented method of receiving and evaluating requests to provide insurance quotes, the method comprising:
    receiving via a communications interface data including a request of a quote to provide insurance services with respect to a first risk in a first category;
    determining by a processor, based on data stored in a memory storage device and indicative of business rules to select data sources correlated with categories of risk, and on data indicative of the first category, one or more sources of data to access;
    accessing via the communications interface the determined one or more sources of data to validate and augment the received data;
    determining by the processor based on the validated and augmented received data whether, with respect to the first risk, (a) to provide a quote or (b) to decline to provide a quote; and
    responsive to determining to provide the quote, providing via the communications interface an output signal having quote data with respect to the first risk; and
    wherein the processor is further configured to:
        furnish the verified and augmented received data to an underwriting engine;
        receive a quote from the underwriting engine;
        furnish the quote in response to the request;
        receive an indication of acceptance of the quote, and provide an output signal to a policy generation system; and
    responsive to determining to decline to provide a quote with respect to the first risk, providing via the communications interface an output signal including the received data with at least partial augmentation to a third party server, and wherein the third party server is a multi-carrier quotation server and configured to, responsive to the data received from the processor, return quotes from a plurality of carriers to underwrite the first risk; and wherein the processor is further configured to:
        generate a return message prior to providing the received data to the third party server, wherein the return message includes the enhanced data, the request of the quote, and an approval to pass the enhanced received data to the third party server;
    receive one or more quotes from the third party server; and
    provide the received one or more quotes in response to the request of the quote.

17. The computer-implemented method of claim 16, wherein the validating the received data includes correcting the received data based on data in the one or more sources of data, and the output signal having quote data includes corrected received data.

18. The computer-implemented method of claim 17, wherein the augmenting the received data includes adding data to the received data, and the output signal having quote data includes the added data.

19. The computer-implemented method of claim 16, further including receiving, responsive to the providing the output signal to the third party server, from the third party server one or more third party quotes to provide insurance services with respect to the first risk, and providing the received one or more third party quotes in response to the request.

20. The computer-implemented method of claim 19, further including furnishing the validated and augmented received data to an underwriting engine, receiving a quote from the underwriting engine, and providing the quote from the underwriting engine together with the received one or more third party quotes in response to the request.

21. The computer-implemented method of claim 16, further including furnishing the validated and augmented received data to an underwriting engine, receiving a quote from the underwriting engine, and providing the quote from the underwriting engine to the third party server.

22. The computer-implemented method of claim 16, further including determining to provide or to decline to provide a second quote for insurance services with respect to a second risk distinct from the first risk.

23. The computer-implemented method of claim 22, wherein the first risk is a first property/casualty risk, and the second quote is for underwriting a second property/casualty risk.

24. The computer-implemented method of claim 22, wherein the first risk is for workers compensation, and the second quote is for group benefits.

25. A non-transitory computer-readable medium having a plurality of instructions thereon of receiving and evaluating requests to provide insurance quotes, which instructions, when executed by a processor, cause the processor to:
    receiving via a communications interface data including a request of a quote to provide insurance services with respect to a first risk in a first category;
    determining, based on data stored in a memory storage device and indicative of business rules to select data sources correlated with categories of risk, and data indicative of the first category, one or more sources of data to access;
    verify the received data with respect to one or more sources of data;
    augment the received data with respect to the one or more sources of data;
    determine based on the verified and augmented received data, with respect to the first risk, one of: (a) to provide a quote or (b) to decline to provide a quote; and
    responsive to determining to provide the quote and in response to the request, provide an output signal having the quote with respect to the first risk; and wherein the processor is further configured to:
        furnish the verified and augmented received data to an underwriting engine;
        receive a quote from the underwriting engine;
        furnish the quote in response to the request;
        receive an indication of acceptance of the quote, and provide an output signal to a policy generation system; and
    responsive to determining to decline to provide the quote with respect to the first risk, provide an output signal including the received data and at least a portion of the augmented data to a third party server, and wherein the third party server is a multi-carrier quotation server and configured to, responsive to the data received from the processor, return quotes from a plurality of carriers to underwrite the first risk; and wherein the processor is further configured to:
        generate a return message prior to providing the received data to the third party server, wherein the return message includes the enhanced data, the request of the quote, and an approval to pass the enhanced received data to the third party server;

receive one or more quotes from the third party server; and provide the received one or more quotes in response to the request of the quote.

26. The computer-readable medium of claim 25, wherein the instructions further cause the processor, in the verifying, to correct the received data based on the verification, to include corrected received data in the output signal.

27. The computer-readable medium of claim 25, wherein the instructions further cause the processor to determine whether to provide a cross sell suggestion for a second risk based on the verified and augmented received data.

28. A computer system of receiving and evaluating requests to provide insurance quotes, the system comprising:
- a first computer system having a first processor; a first memory storage device in communication with the first processor; and a first communications interface for connecting the first computer system to a network;
- a second computer system having a second processor; a second memory storage device in communication with the second processor; and a second communications interface for connecting the second computer system to the network;
- the first processor configured to:
- receive via the communications interface data including a request of a quote to provide insurance services with respect to a risk;
- validate and augment the received data with respect to one or more sources of data to obtain validated and augmented data;
- determine based on the verified and augmented received data, with respect to the first risk, whether: (a) to provide the quote or (b) to decline to provide the quote;
- provide an output signal including enhanced request for proposal data including the received data and at least a portion of the validated and augmented data via the network to the second computer system;
- the second processor configured to, responsive to receiving the enhanced request for proposal data, furnish to a plurality of carrier computer systems data including requests for quotes based on the enhanced request for proposal data, to receive quotes from the carrier computer systems, and to furnish the received quotes to the first computer system;
- the first processor being further configured to return the received quotes to the source; and
- wherein the first computer system is further configured to responsive to determining to provide the quote:
  - furnish the received data and the validated and augmented data to a quotation engine;
  - receive the quote from the quotation engine, and
  - furnish the quote received from the quotation engine to a source of the request of the quote.

29. The system of claim 28, further comprising a third computer system in communication with the first computer system via the network for providing at least a portion of the augmented data in response to a request from the first computer system.

* * * * *